United States Patent [19]

Schaeffer et al.

[11] 4,111,838

[45] Sep. 5, 1978

[54] COMPOSITION FOR CHROMATOGRAPHY

[75] Inventors: James Robert Schaeffer, Rochester; Roy Eugene Snoke, Webster; Harry Wayne Harris, Hamlin, all of N.Y.

[73] Assignee: Eastman Kodak Company, Rochester, N.Y.

[21] Appl. No.: 832,035

[22] Filed: Sep. 9, 1977

[51] Int. Cl.$^2$ ............................................. B01D 15/08
[52] U.S. Cl. .................................... 252/430; 252/428; 210/31 C
[58] Field of Search ............... 252/428, 430; 210/31 C

[56] References Cited

U.S. PATENT DOCUMENTS

| 3,491,086 | 1/1970 | Harvey | 210/31 C X |
|---|---|---|---|
| 3,983,299 | 9/1976 | Regnier | 210/31 C X |
| 4,006,059 | 2/1977 | Butler | 260/112 R X |

FOREIGN PATENT DOCUMENTS 2,319,495  1/1975  Fed. Rep. of Germany ........ 210/31 C

*Primary Examiner*—Patrick P. Garvin
*Attorney, Agent, or Firm*—Arthur L. Girard

[57] ABSTRACT

A chromatographic material comprising an inorganic support-polysaccharide particle matrix is described. The matrix comprises an inorganic support having a high surface density of hydroxyl groups and, covalently attached thereto, insoluble particles of a polysaccharide. The free hydroxyl groups of the matrix can be activated, say, by treatment with cyanogen bromide or sodium metaperiodate, to form active sites where ligands can be attached for affinity chromatography.

20 Claims, No Drawings

COMPOSITION FOR CHROMATOGRAPHY

FIELD OF THE INVENTION

This invention relates to improved chromatographic materials that are useful in the purification of enzymes, antibodies and other biological materials.

BACKGROUND OF THE INVENTION

Affinity chromatography has found wide application in the purification of various biologically active materials, including for example, enzymes, proteins, antibodies, nucleotides, small ligands, and the like. It is known that certain polysaccharide matrices comprise the most useful solid supports for affinity chromatography. Various methods exist to activate a polysaccharide matrix, e.g., cellulose, starch, and various crosslinked polysaccharide gels such as agarose, Sephadex ® and Sepharose ®, for the covalent attachment of, e.g., small ligands and proteins. A widely used technique for the covalent coupling of, say, protein to insoluble matrices, finding considerable application in immunology and enzymology, is the cyanogen bromide method described in Axen et al, Nature, 214, 1302-4 (1967); see also Cuatrecasas et al, Proc. Natl. Acad. Sci. U.S., 61, 636-43 (1968). Another useful activation method described by Cuatrecasas et al in U.S. Pat. No. 3,947,352, issued Mar. 30, 1976 comprises sodium periodate oxidation followed by reductive amination using sodium borohydride or sodium cyanoborohydride.

The use of activated polysaccharides having ligands attached to purify biologically active material has been found a powerful laboratory tool. However, affinity chromatography using these materials is time consuming, especially when larger volumes, i.e., more than a liter, are desired to be purified because these materials produce columns having slow flow rates. One way to obtain faster flow rates is to attach a monolayer of a polysaccharide to an inorganic support, such as a glass bead, as described in U.S. Pat. No. 4,006,059, issued Feb. 1, 1977 to Butler or in U.S. Pat. No. 3,983,299, issued Sept. 28, 1976 to Regnier. These patents describe the attachment of a monolayer of dextran, starch, glycerol, etc. to an inorganic bead. The resultant chromatographic material has much improved flow rates over the activated polysaccharides described above. However, we have found that these materials having a monolayer of polysaccharide attached to an inorganic bead do not provide as high a degree of purification as desired (see examples herein). Thus it would be desirable to have a chromatographic material that provides columns with high flow rates and that also provides a high degree of purification.

SUMMARY OF THE INVENTION

The present invention provides a chromatographic material comprising an inorganic support having a high surface density of hydroxyl groups and, covalently attached thereto, insoluble particles of a polysaccharide to form an inorganic support-polysaccharide particle matrix. The matrix can be activated, e.g., by treating with cyanogen bromide or sodium metaperiodate, etc., and a ligand can be covalently attached to produce a material useful for affinity chromatography. Such material unexpectedly has both high flow rates and high purification capability for biological materials. These high flow rates and the high purification capability of the materials of the present invention are apparently due to the particulate nature of the polysaccharide that is bonded to the support in contradistinction to prior art materials that have monolayers of polysaccharide on a support.

DETAILED DESCRIPTION OF THE INVENTION

In accord with the present invention a chromatographic material comprises an inorganic support having a high density of hydroxyl groups and, covalently attached thereto, insoluble particles of a polysaccharide. Examples of some inorganic supports to which polysaccharides can be covalently bonded include porous silica, controlled porosity glass, controlled porosity ceramic, alumina, and the like. In principle, polysaccharides can be covalently bonded to any inorganic support containing a high surface density of hydroxyl groups. A particularly useful support material is controlled porosity glass beads (CPG) which are available commercially from Corning Glass Works.

The chromatographic materials of this invention comprise particles of insoluble polysaccharide covalently bonded to an inorganic support such as described above. Examples of useful such polysaccharide particles include crosslinked polysaccharide gels such as agarose gel, polyacrylamide-agarose gel, and the like. Especially useful polysaccharide particles are agarose gels commercially available from Pharmacia Fine Chemicals Co. (Piscataway, New Jersey) under the trademarks Sepharose ® and Sephadex ®.

The inorganic substrate having a high surface density of hydroxyl groups and the polysaccharide particles can be covalently bonded together by any known chemical reaction. A convenient procedure is outlined below. First the polysaccharide is activated by reaction with cyanogen bromide.

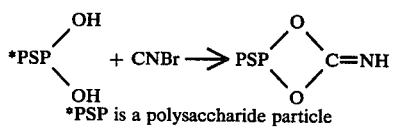

*PSP is a polysaccharide particle

Then a diamine linking compound is attached to the activated polysaccharide.

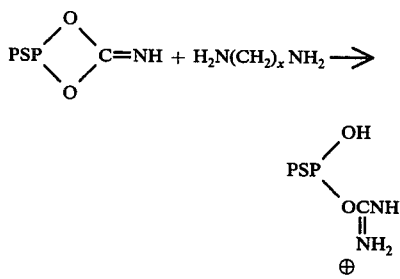

Next the inorganic support material is activated with cyanogen bromide.

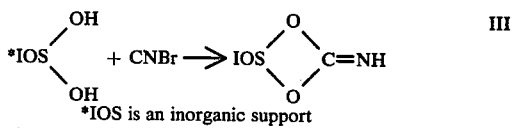

*IOS is an inorganic support

Then the activated inorganic support and the polysaccharide particle with the attached linking compound from Equation II are reacted together.

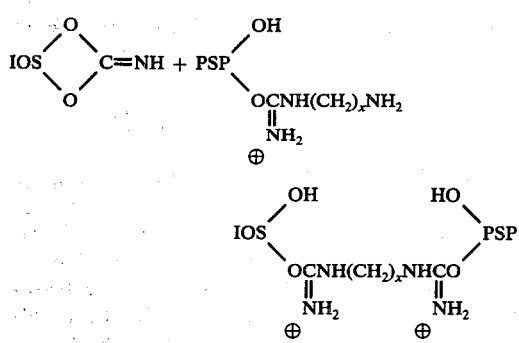

In the above equations $x$ is an integer having a value 3 or greater.

The product resulting from the reaction of Equation IV above is typically granular when the inorganic support is a bead or the like. From photomicrographs of the product of Equation IV it appears that many polysaccharide particles are typically attached to one bead of inorganic support. However, it is easy to see from the reaction sequence that a polysaccharide particle may be covalently bonded to more than one bead of inorganic support material. Thus, since the polysaccharide particle is multifunctional, more than one point of attachment to the inorganic support may exist and the polysaccharide may bridge two or more inorganic support particles.

The quantity of polysaccharide particles present in the chromatographic matrix material of this invention is dependent, among other things, on the particular inorganic substrate being used, on the structural shape of the substrate, and on the relative size of the polysaccharide particles versus the substrate. Generally, however, the polysaccharide particles are present in an amount of from about 1 percent to about 10 percent by weight of the inorganic support and preferably in an amount of from about 2 to about 6 percent by weight based on the weight of the inorganic support. Particularly useful results can be obtained when using controlled porosity glass beads as the support when the polysaccharide particles are present in an amount equal to from about 3 to about 5 percent by weight of the glass beads.

The particle size of the polysaccharide and of the inorganic support can vary depending upon the particular materials, the biological material to be purified, the quantities of biological material to be purified, etc. It is generally desired, however, that the mean particle size of the inorganic support material be larger than the mean particle size of the polysaccharide. Useful results can be obtained, for example, when the particle size of the inorganic support material is in the range of from about 100 to about 1000 micrometers and the particle size of the polysaccharide is in the range of from about 25 to about 300 micrometers.

While the chromatographic matrix material described above is useful per se, it can be used to produce even more useful chromatographic materials by activating the hydroxyl groups and attaching a ligand to the activated sites. Such activated matrix materials having a ligand covalently attached to the activated site are particularly useful for affinity chromatography. The particular ligand is selected depending on the biological material to be purified. As discussed above, the hydroxyl groups can be activated by any known technique, say for example, by cyanogen bromide activation or by sodium metaperiodate activation, etc.

Generally considering the use of CNBr-activation, the amount of ligand coupled to the polysaccharide depends on the amount of CNBr added. Typically, this varies between 50 and 300 mg of CNBr per milliliter of packed beads. For example, with 200 mg of CNBr per milliliter of inorganic support-polysaccharide particle matrix material, if the concentration of low molecular weight ligand, e.g., alanine, is 0.1 M, the amount coupled will be about 10 $\mu$moles per milliliter of inorganic support-polysaccharide particle matrix material. The actual coupling efficiency will depend on the specific ligand used.

The quantity of CNBr and the exact composition of the buffer used in the coupling reaction should be adapted to the specific system under study. These conditions have been described in detail, Cuatrecasas, J. Biol. Chem., 245, 3059 (1970). A standard condition is the use of 200 mg of CNBr per milliliter of matrix material and of 0.2 M sodium bicarbonate at pH 9.5 as the buffer for the coupling reaction. Smaller quantities of CNBr, lower pH values, and high concentrations of ligand will decrease the probability of multipoint attachments of proteins (especially those of high molecular weight) to the matrix, a condition that may lead to decreased or altered biological activity.

In many cases, the interposition of spacers or "arms" between the matrix and the ligand greatly increases the effectiveness of the adsorbent. A variety of spacer molecules can be attached to polysaccharides, and many chemical reactions exist that can be used to couple ligands and proteins to these derivatized polysaccharides, Cuatrecasas, J. Biol. Chem., supra. Diaminodipropylamine (Eastman) has been one of the most useful spacer molecules because it is relatively long and because it exhibits very minimal hydrophobic properties as compared to strictly methylenic diamine compounds such as hexamethylenediamine. Whenever possible, it is advantageous to first attach such spacers to the ligand rather than to the polysaccharide since the adsorbents prepared in this way are less likely to exhibit nonspecific or ionic properties that can interfere in subsequent affinity chromatography procedures.

A typical reaction for adding a ligand to the matrix material of this invention is illustrated by following equations that depict the coupling of an amino-ligand to the composite material. First the matrix material is activated by reacting with cyanogen bromide.

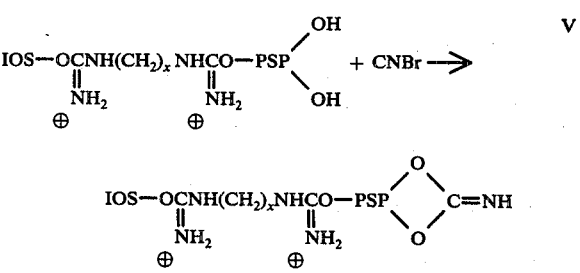

Next, the amino-ligand is covalently bonded to the activated site.

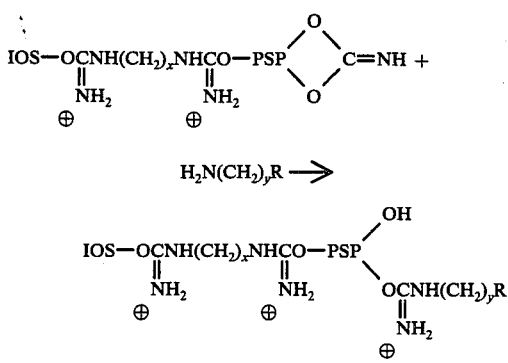

In the above equations $x$ is an integer having the value 3 or more, $y$ is an integer having a value from 2 to about 30, and R is $CH_3$, $NH_2$ or $NR_2'$ where R' is a lower alkyl group having from 1 to about 4 carbon atoms. Of course, other known chemical reactions can be used to couple these and other ligands to the inorganic support-polysaccharide particle matrix material. Although the equations above illustrate only the bonding of the ligand to the polysaccharide portion of the matrix, it is realized that the inorganic support also has free hydroxyl groups that may be activated and available for bonding with the ligand.

The inorganic support-polysaccharide particle matrix material of this invention may be used as a chromatographic material as is or it may be activated so that ligands may be attached to the matrix as described above. An activated inorganic support-polysaccharide particle matrix can be prepared and stored for use, at which time a suitable ligand can be attached and the resulting material used for purifying biologically active materials in accord with this invention. The inorganic support-polysaccharide particle matrix can be activated for storage and future use by a variety of known reactions, for example, by the cyanogen bromide method described by Johansson et al in U.S. Pat. No. 3,914,183 issued Oct. 21, 1975, or by the sodium metaperiodate method described by Cuatrecasas et al in U.S. Pat. No. 3,947,352, issued Mar. 30, 1976, the disclosures of which are hereby incorporated by reference, etc.

The following examples are provided to further illustrate the present invention.

EXAMPLE 1 Preparation of Glass-AH Sepharose ® 4B

In 50 ml of distilled water, 4.0 g of Glass (a borosilicate base controlled porosity glass having a particle size diameter in the range of from 170 to 840 micrometers manufactured by Corning Glass Works and distributed by Pierce Chemical Co., Rockford, Illinois) was suspended. The pH of the magnetically stirred suspension was adjusted to 11 with 6 M potassium hydroxide and the temperature was adjusted to 18° C by addition of pieces of ice. Cyanogen bromide (0.5 g) was added and the pH was maintained at 10.5–11 for 35 min. by addition of 6 M potassium hydroxide as needed; the temperature was maintained at 18° C. by addition of ice. The reaction mixture was filtered (vacuum), and the solids were washed with 400 ml of ice water. The solids were suspended in 50 ml of distilled water and 2.0 g of commercial AH Sepharose ® 4B (including associated dextrin) was added. The pH of the suspension was adjusted to 8.5, and the reaction mixture was stirred at 11° C for 72 hr. The product was washed with cold distilled water. AH Sepharose ® 4B is a beadform agarose gel having a wet bead diameter in the range of 40 to 190 micrometers available from Pharmacia Fine Chemical Co., Piscataway, New Jersey. The commercial AH Sepharose ® 4B as supplied by Pharmacia contains a large quantity of dextran and lactose. The weights used include the weight of the dextran mixture associated with the AH Sepharose ® 4B. The dextran mixture does not take part in the reaction and is removed when the product is first washed.

EXAMPLE 2 Preparation of CPG550-AH Sepharose ® 4B 1,6-Diaminohexane

The CPG550-AH Sepharose ® 4B product from Example 1 was resuspended in 50 ml. of distilled water and 1.0 g of cyanogen bromide was added. The pH of the reaction mixture was maintained between 10.5 and 11 by addition of 6 M potassium hydroxide, and the temperature was maintained at 18° C by addition of ice (reaction time 30 min). The solids were collected, washed with 400 ml of ice water and resuspended in a mixture of 40 ml of dioxane and 8 ml of water containing 8.0 g of 1,6-diaminohexane. The suspension was stirred at room temperature for 18 hr. 4.0 G of ethanolamine was added, and stirring was continued for an additional 18 hr. The product was collected, washed with 800 ml of 70% aqueous dioxane, 50 ml of dioxane, 300 ml of distilled water and 50 ml of 2 M potassium chloride (negative 2,4-dinitrobenzenesulfonate test). The product was stored under 50 ml of 2 M potassium chloride.

EXAMPLE 3 Purification of Uricase on CPG550-AH Sepharose ® 4b-1,6-Diaminohexane

An aliquot of the material prepared in Example 2 was placed in a Pasteur pipette containing a glass wool plug. The column volume was 0.7 ml. The column was washed with water then with 50 mM potassium phosphate buffer plus ethylenediamine tetracetic acid (pH 8.6). The uricase sample, extracted from Micrococcus luteus, was prepared by ammonium sulfate precipitation followed by solution and dialysis in buffer. A sample containing 6.2 units uricase and 1101 units catalase was applied to the column. Fractions were eluted with 50 mM potassium phosphate buffer containing 0.5 M, 0.5 M, 1.0 M and 2.0 M sodium chloride as fractions 1–4 respectively. Each fraction was assayed for uricase and catalase activity and the results are reported in Table 1 below.

Table 1

Chromatographic Purification of Bacterial Uricase with CPG550-AH Sepharose ® 4B-1,6-Diaminohexane

| Fraction | Activity, %* | |
|---|---|---|
| | Uricase | Catalase |
| Wash | 18 | 7 |
| 1 | 22 | 3 |
| 2 | 95 | 27 |
| 3 | 4 | 51 |
| 4 | 2 | 21 |

*Activity is expressed as percent of units applied.

EXAMPLE 4 Purification of Cholesterol Oxidase on CPG550-AH Sepharose ® 4B-1,6-Diaminohexane An aliquot of CPG550-AH Sepharose ® 4B-1,6-diaminohexane prepared the same as in Example 2 was placed in a Pasteur pipette containing a glass wool plug. The column volume was 0.7 ml. The column was washed with water then with 0.1 M phosphate buffer, pH 7.0. A cholesterol oxidase sample, extracted from Nocardia cholesterolicum, NRRL 5767, was prepared by ammonium sulfate precipitation followed by solution and dialysis in buffer. A sample containing 18.0 units cholesterol oxidase was applied to the column. Enzyme was eluted with 10 mM Tris-Cl, pH 8.0, containing 1.0 M sodium chloride (Fraction 1) and 1.0 M sodium chloride — 1% desoxycholate (Fraction 2). Each fraction was assayed for cholesterol oxidase activity and the results are reported in Table 2 below.

Table 2

| Chromatographic Purification of Cholesterol Oxidase on CPG550-AH Sepharose ® 4B-1,6-Diaminohexane | |
|---|---|
| Fraction | Activity, %* |
| Wash | 1 |
| 1 | 57 |
| 2 | 5 |

EXAMPLE 5 Preparation of CPG550-AH Sepharose ® 4B-Oleylamine

In 500 ml of distilled water, 40 g of CPG550 glass was suspended. This suspension was mechanically stirred (150 rpm), and the pH was adjusted to 11 with 6 M potassium hydroxide. The temperature was adjusted to 18° C. with ice. Cyanogen bromide (5 g) was added and the pH was maintained between 10.5 and 11 for 35 min. by addition of 6 M potassium hyroxide as needed. The temperature was maintained at 18° C. by addition of ice. The reaction mixture was filtered (vacuum) and washed with 4 liters of ice water. The solids were suspended in 500 ml of distilled water and 20 g of commercial AH Sepharose ® 4B (including associated dextrin) was added. The pH was adjusted to 8.5 and the reaction mixture was stirred at 11° C for 72 hr.

To this suspension, 10 g of cyanogen bromide was added. The pH of the reaction mixture was maintained between 10.7 and 11.3 by addition of 6 M potassium hydroxide. The temperature of the reaction mixture was maintained at 18° C by addition of ice to the reaction mixture (reaction time 30 min). The solids were collected and washed with 4 liters of ice water. The solids were suspended in a mixture of 80 g of oleylamine dissolved in a composition of 400 ml dioxane and 80 ml water. The reaction mixture was stirred (150 rpm) for 18 hr at room temperature, then 40 g of ethanolamine was added and the reaction mixture was stirred an additional 18 hr. The product was collected, washed with 8 liters of 70% aqueous dioxane, 500 ml dioxane, 3 liters distilled water, then 500 ml 2 M potassium chloride. The product was stored under 500 ml of 2M potassium chloride.

EXAMPLE 6 Partial Purification of Lipase M by Affinity Chromatography

Crude lipase M powder (obtained from Enzyme Development Corp.) was suspended in distilled water (10% w/v) and centrifuged. The supernatant fraction was dialyzed by diafiltration until the permeate was clear, then this material was lyophilized. A 668 ml bed volume column (10 × 8.5 cm) of CPG550-AH Sepharose ® 4B-oleylamine was prepared and equilibrated with 0.1 M Tris-Cl, pH 8.0. A 15.0 g sample of lipase M dissolved in 1600 ml of Tris buffer was applied to the column. This column was eluted sequentially by five column volumes of Tris buffer (Fraction 2), four volumes of 1.0 M sodium chloride in Tris buffer (Fraction 3), three volumes of Tris buffer (Fraction 4), and three volumes of Tris buffer containing 0.1 M sodium chloride and one percent desoxycholate (Fraction 5). Fraction 5 was dialyzed against water, then lyophilized prior to storage. Cholesterol esterase (CE) and triglyceride esterase (TE) activities of Fraction 5 were assayed. Protein was assayed as described by Layne (Methods of Enzymology, 3, 451, 1957). A summary of the affinity column purification is presented in Table 3. Elution patterns of protein, CE, and TE activities are illustrated in Table 4.

Table 3

| Affinity Column Purification of Lipase M | | | | |
|---|---|---|---|---|
| | | Activity | | |
| Sample | Enzyme | Total Units | Units per mg Protein | Purification |
| Partially Purified Enzyme Applied to Column | CE | 3154 | 0.86 | 1 |
| | TE | 1501 | 0.33 | 1 |
| Column Purified Enzyme | CE | 4000 | 6.0 | 7 |
| | TE | 2151 | 3.2 | 9.7 |

Table 4

| Affinity Column Purification of Lipase M | | | |
|---|---|---|---|
| | | Activity, units × $10^3$ | |
| Fraction | Protein,g | Cholesterol esterase | Triglyceride esterase |
| 1 | 2.1 | 0.1 | 0.5 |
| 2 | 2.3 | 0.7 | 0.8 |
| 3 | 0.4 | 0.15 | 0.5 |
| 4 | 0 | 0 | 0.4 |
| 5 | 0.72 | 4.0 | 2.1 |

EXAMPLE 7 Preparation of Glycophase G/CPG1500-Oleylamine

In 30 ml of distilled water, 25 ml of glass (Glycophase G/CPG1500) was suspended. To the magnetically stirred mixture, 6.3 g of cyanogen bromide was added in small portions. The pH was maintained at 9–10 with 0.1 N sodium hydroxide and the temperature at 27° C by addition of ice (reaction time 30 min). The solids were collected and washed with 2 liters of ice water then placed in 30 ml of distilled water. To this suspension, 15 ml of oleylamine dissolved in 20 ml dioxane was added, and the reaction mixture was shaken for one hour at 25° C. Ethanolamine (5 ml) dissolved in 25 ml of potassium phosphate buffer (pH 7) was added, and the mixture was shaken an additional hour. The product was collected and washed with 2 liters of dioxane followed by a liter of buffer. The wash was repeated, and the solids were stored under 25 ml of buffer.

EXAMPLE 8 Effect of Variation of Amount of AH Sepharose ®4B to Glass on the Recovery of Enzymatic Activity and Column Flow Rates Material was prepared as in Example 4, except that the columns contained varying amounts of CPG550-AH Sepharose ® 4B modified with oleylamine. The results for two runs are tabulated below in Table 5.

Table 5
Effect of Variation of Amount of AH Sepharose ® 4B to Glass on the Recovery of Enzymatic Activity and Flow Rates of Column

| wt% AH Sepharose ® 4B Based on Glass | % Recovery of Enzymatic Activity | | Column Flow Rate | |
|---|---|---|---|---|
| | Run 1 | Run 2 | Run 1 | Run 2** |
| 1.2 | 0 | 38 | slow | 0.47 |
| 3 | 50 | 35 | Fast | 1.01 |
| 6 | 58* | 42 | Fast | 0.79 |
| 12 | 0 | 0 | Very Slow | 0.12 |

*A 7-fold purification of enzymatic protein is obtained.
**Flow rate is given in ml. per min. per ml. of bed material.

Also, this combination of agarose beads covalently bonded to glass beads exhibits a substantial difference in separation capability (3.6 to 7-fold purification of enzyme) compared with commercially available glass coated with a monolayer of carbohydrate (2-fold purification of enzyme) as shown in Table 6.

Table 6
Comparison of Purification and Flow Rate of Commercial Monolayer Carbohydrate Coated Glass With the Modified Polysaccharide Particle-Glass Matrix of the Invention

| Column Material | % Recovery of Enzymatic Activity | | Purification Factor | | Flow Rate | |
|---|---|---|---|---|---|---|
| | Run 1 | Run 2 | Run 1 | Run 2 | Run 1 | Run 2** |
| Glycophase G/CPG 1500/Oleylamine (Example 7)* | 90 | 115 | 2 | 2 | Slow | 0.16 |
| Monolayer Dextran/CPG550/Oleylamine (prior art) | 90 | 57 | 2 | 2 | Fast | 0.95 |
| Monolayer N-hydroxysuccinimide/CPG550/Oleylamine (prior art) | 90 | 86 | 2 | 2 | Fast | 1.08 |
| Polysaccharide Particle Glass Matrix Modified with Oleylamine | 68 | 99 | 7 | 3.6 | Fast | 0.79 |

*Material not within the scope of the invention.
**Flow rate is given in ml. per min. per ml. of bed material.

EXAMPLE 9 Preparation of CPG550-AH Sepharose ®4B-3-Diethylaminopropylamine

To a stirred suspension of CPG550-AH Sepharose ® 4B prepared as described in Example 1, 2.0 g of cyanogen bromide was added. The pH of the reaction mixture was maintained between 10.5 and 11 by addition of 6 M potassium hydroxide. The temperature of the reaction mixture was maintained at 18° C by addition of ice (reaction time 30 min). The solids were collected and washed with 200 ml of ice water and suspended in a composition of 40 ml of dioxane and 8 ml of water containing 8.0 g of 3-diethylaminopropylamine. The reaction mixture was shaken at 11° C for 24 hr; the product was collected and washed with 4 liters of distilled water (negative 2,4-dinitrobenzenesulfonate test). The product was stored under 50 ml of 2 M potassium chloride.

EXAMPLE 10 Purification of α-Glycerophosphate Oxidase on CPG550-AH Sepharose ® 4B-3-Diethylaminopropylamine An aliquot of CPG550-AH Sepharose ®4B-3-diethylaminopropylamine was placed in a Pasteur pipette containing a glass wool plug. The column volume was 0.7 ml. The column was washed with water then with 0.1 M potassium phosphate, pH 7.0. The α-glycerophosphate oxidase sample extracted from Streptococcus faecalis was prepared by ammonium sulfate precipitation followed by solution and dialysis in buffer. A sample containing 0.728 units α-glycerophosphate oxidase (GPO) and 0.146 units lactate oxidase (LO) was added to the column. Activities were eluted with 0.1 M potassium phosphate buffer, pH 7.0, containing 0.05 M, 0.075 M, and 0.3 M sodium chloride as fractions 1 through 3, respectively. The fractions were assayed for GPO activity and LO activity and the results are reported in Table 7.

Table 7
Chromatographic Purification of α-Glycerophosphate Oxidase with CPG550-AH Sepharose ® 4B-3-Diethylaminopropylamine

| Fraction | Activity, %* | |
|---|---|---|
| | GPO | LO |
| 1 | 0 | 0 |
| 2 | 0 | 0 |
| 3 | 93 | 0 |

*Activity is expressed as percent of units applied.

This invention has been described in detail with particular reference to certain preferred embodiments thereof, but it will be understood that variations and modifications can be effected within the spirit and scope of the invention.

We claim:

1. A composition comprising an inorganic support having a high surface density of hydroxyl groups and, covalently attached thereto, particles of polysaccharide to form an inorganic support-polysaccharide particle matrix.

2. A composition as described in claim 1 wherein said inorganic support is selected from the group consisting of porous silica, controlled porosity glass, controlled porosity ceramic, and alumina.

3. A composition as described in claim 1 wherein said particles of polysaccharide are comprised of agarose gel or polyacrylamide-agarose gel.

4. A composition as described in claim 1 wherein said inorganic support is a bead having a particle size in the range of from about 100 to about 1000 micrometers.

5. A composition as described in claim 4 wherein said particles of polysaccharide have a particle size in the range of from about 25 to about 300 micrometers.

6. A composition comprising an inorganic support having a high surface density of hydroxyl groups and, covalently attached thereto, particles of polysaccharide to form an inorganic support-polysaccharide particle matrix, the hydroxyl groups of said inorganic support-polysaccharide particle matrix being activated for reaction with and covalent bonding with a ligand.

7. A composition as described in claim 6 wherein said hydroxyl groups have been activated by treatment with cyanogen bromide.

8. A composition as described in claim 6 wherein said hydroxyl groups have been activated by treatment with sodium metaperiodate.

9. A composition comprising an inorganic support-polysaccharide particle matrix having active sites comprising activated hydroxyl groups and ligands attached to said active sites; said inorganic support-polysaccharide particle matrix comprising an inorganic support having a high surface density of hydroxyl groups and, covalently attached thereto, particles of polysaccharide.

10. A composition as described in claim 9 wherein said ligands are attached to said active sites of said inorganic support-polysaccharide particle matrix by means of a spacer molecule.

11. A composition as described in claim 10 wherein said spacer molecule is diaminodipropylamine.

12. A composition as described in claim 9 wherein said activated hydroxyl groups are activated by treatment with cyanogen bromide.

13. A composition as described in claim 9 wherein said activated hydroxyl groups are activated by treatment with sodium metaperiodate.

14. A composition comprising an inorganic support-agarose gel matrix having active sites comprising activated hydroxyl groups and ligands attached to said active sites, said inorganic support-agarose gel matrix comprising an inorganic support having a high surface density of hydroxyl groups and, covalently attached thereto, particles of agarose.

15. A composition as described in claim 14 wherein said ligands are comprised of diaminoalkane.

16. A composition as described in claim 15 wherein said diaminoalkane is 1,6-diaminohexane.

17. A composition as described in claim 14 wherein said ligands are comprised of oleylamine.

18. A composition as described in claim 14 wherein said ligands are comprised of 3-diethylaminopropylamine.

19. A composition as described in claim 14 wherein said inorganic support is selected from the group consisting of porous silica, controlled porosity glass, controlled porosity ceramic, and alumina.

20. A composition as described in claim 14 wherein said agarose is present in said inorganic support-agarose gel matrix in an amount in the range of from about 1 to about 10 percent by weight based on the weight of the inorganic support.

* * * * *